(12) United States Patent
Yan et al.

(10) Patent No.: US 11,303,166 B2
(45) Date of Patent: Apr. 12, 2022

(54) AXIAL FLUX MOTOR AND ELECTRICAL PRODUCT

(71) Applicant: NIDEC CORPORATION, Kyoto (JP)

(72) Inventors: Guo-Jhih Yan, Taipei (TW); Hsiu-Ying Lin, Taipei (TW); Keng-Chang Wu, Taipei (TW); Kuo-Min Wang, Taipei (TW)

(73) Assignee: NIDEC CORPORATION, Kyoto (JP)

( * ) Notice: Subject to any disclaimer, the term of this patent is extended or adjusted under 35 U.S.C. 154(b) by 56 days.

(21) Appl. No.: 16/709,930

(22) Filed: Dec. 11, 2019

(65) Prior Publication Data

US 2020/0204016 A1 Jun. 25, 2020

(30) Foreign Application Priority Data

Dec. 24, 2018 (CN) .......................... 201811582160.6

(51) Int. Cl.
*H02K 1/18* (2006.01)
*H02K 1/14* (2006.01)

(52) U.S. Cl.
CPC ............. *H02K 1/182* (2013.01); *H02K 1/145* (2013.01)

(58) Field of Classification Search
CPC ................................. H02K 21/24; H02K 1/02
USPC ....... 310/12.21, 49.13, 49.19, 49.22, 156.37, 310/216.002, 216.003, 216.006, 266, 267, 310/268
See application file for complete search history.

(56) References Cited

U.S. PATENT DOCUMENTS

| | | | | |
|---|---|---|---|---|
| 2010/0148611 | A1* | 6/2010 | Wang | H02K 21/24 310/156.37 |
| 2011/0095642 | A1* | 4/2011 | Enomoto | H01F 3/04 310/216.045 |
| 2012/0133231 | A1* | 5/2012 | Hayakawa | H02K 21/24 310/156.37 |

FOREIGN PATENT DOCUMENTS

| | | |
|---|---|---|
| JP | 2011091932 | 5/2011 |
| JP | 2012120319 | 6/2012 |

* cited by examiner

*Primary Examiner* — Jose A Gonzalez Quinones
(74) *Attorney, Agent, or Firm* — JCIPRNET

(57) ABSTRACT

Embodiments of the disclosure provide an axial flux motor and an electrical product. The motor includes a rotor which rotates with a central axis as a center, and a stator which is disposed opposite to the rotor in an axial direction and has a plurality of stator units, the plurality of stator units being disposed around the central axis. The stator unit includes a core unit formed by a core piece, and a coil unit formed by a wire wound and disposed around the core unit. A height of the core unit in the axial direction is less than or equal to a height of the coil unit in the axial direction. With the embodiments of the disclosure, the dependency between the coil and the core in design and manufacture can be reduced, and the degree of design freedom can be improved.

8 Claims, 5 Drawing Sheets

AXIAL FLUX MOTOR AND ELECTRICAL PRODUCT

CROSS-REFERENCE TO RELATED APPLICATION

This application claims the priority of China patent application serial no. 201811582160.6, filed on Dec. 24, 2018. The entirety of the above-mentioned patent application is hereby incorporated by reference herein and made a part of this specification.

BACKGROUND

Technical Field

The disclosure relates to the technical field of motors, and more particularly to an axial flux motor and an electrical product.

Description of Related Art

In the prior art, an axial flux motor is a common motor. In the structure of an axial flux motor, a segmented stator formed by a plurality of stator segments is used, and each of the stator segments is disposed with a core and a coil. The core has tooth portions respectively at two ends in an axial direction and has a connecting portion connecting the tooth portions at the two ends, and the coil is wound around the connecting portion.

It should be noted that the above description of the background is only for facilitating a clear and complete description of the technical solutions of this application and facilitating the understanding by persons skilled in the art. The above technical solutions are not considered to be known to persons skilled in the art simply because these solutions are described in the background section of this application.

The inventors have found that when it is necessary to make design changes to the stator segments to obtain an axial flux motor adapted to different application requirements, on the one hand, it is conceivable to change the design of the shape or size of the core. However, since the core has tooth portions respectively at two ends, if the design of the shape or size of the core is to be changed, the corresponding manufacturing molds and/or jigs also need to be changed, resulting in a significant increase in cost.

On the other hand, it is conceivable not to change the design of the shape or size of the core but to change only the design of the coil. However, the height of the coil in the axial direction is limited by the tooth portions at two ends of the core; further, in order for the coil to match the shape and size of the core, during manufacture, the coil is usually wound around the core first, and then the stator segments are assembled together.

Therefore, in the prior art, in design and manufacture, there is a strong dependency between the coil and the core, and the degree of design freedom is low.

In order to solve the above problems or other similar problems, embodiments of the disclosure provide an axial flux motor and an electrical product; with the axial flux motor and the electrical product, the dependency between the coil and the core in design and manufacture can be reduced, and the degree of design freedom can be improved.

SUMMARY

According to a first aspect of the embodiments of the disclosure, an axial flux motor is provided. The axial flux motor includes a rotor which rotates with a central axis as a center, and a stator which is disposed opposite to the rotor in an axial direction and has a plurality of stator units, the plurality of stator units being disposed around the central axis. The stator unit includes a core unit formed by a core piece and a coil unit formed by a wire wound and disposed around the core unit, and a height of the core unit in the axial direction is less than or equal to a height of the coil unit in the axial direction.

According to a second aspect of the embodiments of the disclosure, an electrical product is provided. The electrical product includes the axial flux motor according to the above first aspect.

BRIEF DESCRIPTION OF THE DRAWINGS

The accompanying drawings are included to provide a further understanding of the embodiments of the disclosure. The drawings constitute a part of the specification to illustrate the embodiments of the disclosure and serve to describe the principles of the disclosure in conjunction with the written description. Obviously, the drawings in the following description are only some embodiments of the disclosure, and persons skilled in the art can obtain other drawings according to these drawings without any creative labor. In the drawings.

DESCRIPTION OF THE EMBODIMENTS

An advantageous effect of the embodiments of the disclosure is that by disposing the coil unit around the core unit and by disposing so that the height of the core unit in the axial direction is not greater than the height of the coil unit in the axial direction, the dependency between the coil and the core in design and manufacture can be reduced, and the degree of design freedom can be improved.

The embodiments of the disclosure are disclosed in detail with reference to the following description and accompanying drawings. It should be understood that the scope of the embodiments of the disclosure is not limited to the above.

The embodiments of the disclosure include many variations, modifications, and equivalents within the spirit and scope of the appended claims.

Features described and/or shown with respect to one embodiment may be used in one or more other embodiments in the same or similar manner, in combination with, or in place of, features in other embodiments.

It should be emphasized that the terms "comprising/including/containing/having" as used herein refer to the presence of a feature, an assembly, or a component, but does not exclude the presence or addition of one or more other features, assemblies or components.

The foregoing and other features of the disclosure will be apparent with reference to the drawings and the following description. The specific embodiments of the disclosure are specifically disclosed in the specification and the drawings, which describe some embodiments in which the principles of the disclosure may be employed. It should be understood that the disclosure is not limited to the embodiments described herein but includes all the modifications and equivalents within the scope of the appended claims.

In the embodiments of the disclosure, singular forms such as "a," "an" and "the" include plural forms and should be understood broadly as "a type" or "a kind" instead of narrowly as "one in number." In addition, the term "the" should be understood to include both singular and plural forms, unless otherwise specified in the context. In addition, the term "according to" should be understood to mean "according at least in part to", and the term "based on" should be understood to mean "based at least in part on," unless otherwise specified in the context.

In the following description of the disclosure, for convenience of description, a central line around which a rotating portion of a motor may rotate is referred to as a "central axis," and a direction that is the same as or parallel to a direction extending along the central axis is referred to as an "axial direction," and a direction around the central axis is referred to as a "circumferential direction."

The embodiments of the disclosure will be described below with reference to the accompanying drawings.

Embodiment 1

Figure 1:
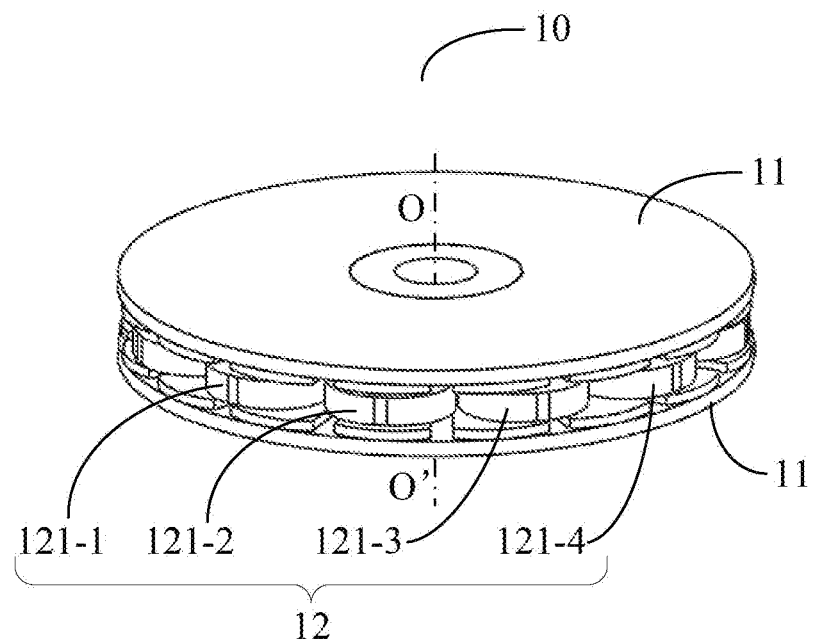
FIG. 1 is a schematic view of the axial flux motor of Embodiment 1 of the disclosure.
Figure 2:
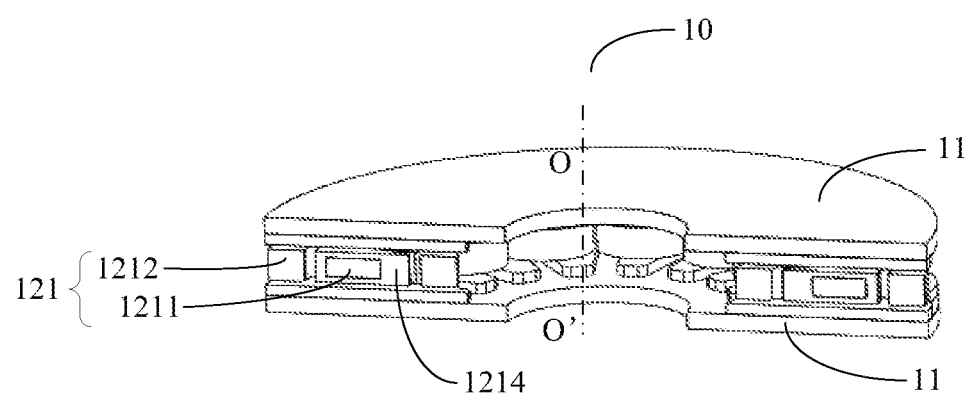
FIG. 2 is a schematic cross-sectional view of the axial flux motor of Embodiment 1 of the disclosure taken along a plane on which the central axis is located.
Figure 3:
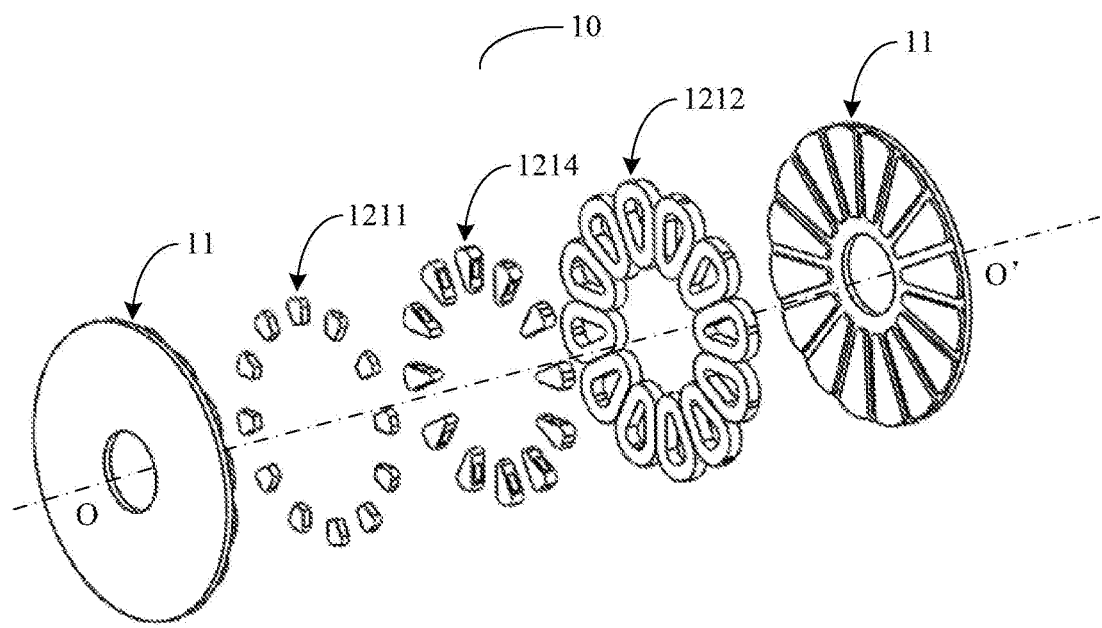
FIG. 3 is an exploded view of the axial flux motor of Embodiment 1 of the disclosure.
Figure 4:
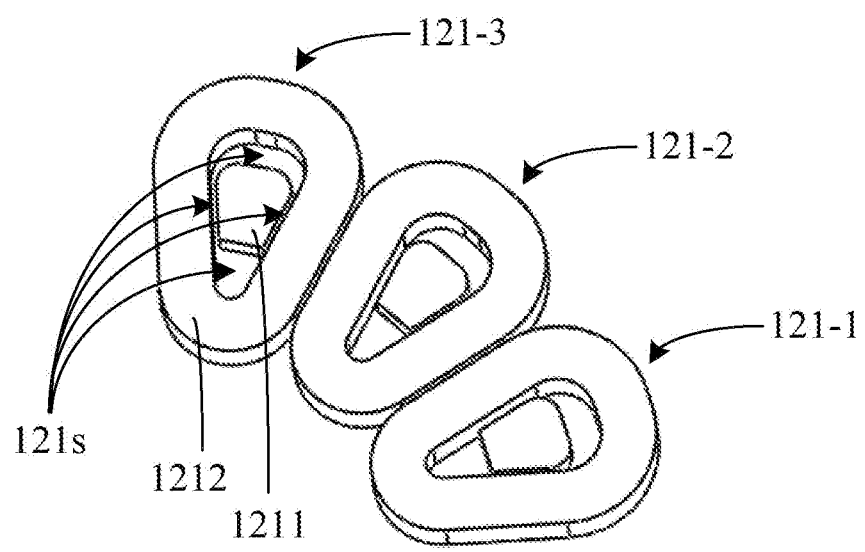
FIG. 4 is a schematic view of stator units of the axial flux motor of Embodiment 1 of the disclosure.
Figure 5:
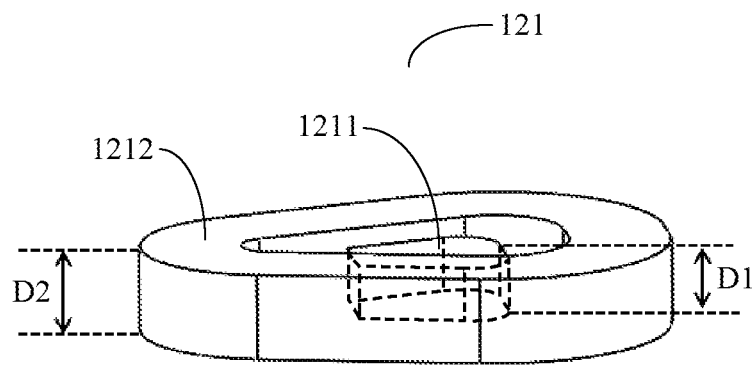
FIG. 5 is another schematic view of the stator unit of the axial flux motor of Embodiment 1 of the disclosure.

Embodiment 1 provides an axial flux motor. FIG. 1 is a schematic view of the axial flux motor of the embodiment. FIG. 2 is a schematic cross-sectional view of the axial flux motor of the embodiment taken along a plane on which the central axis is located. FIG. 3 is an exploded view of the axial flux motor of the embodiment. FIG. 4 is a schematic view of stator units of the axial flux motor of the embodiment. FIG. 5 is another schematic view of the stator unit of the axial flux motor of the embodiment.

As shown in FIGS. 1 to 3, an axial flux motor 10 has a rotor 11 and a stator 12, wherein the rotor 11 rotates with an central axis O-O' as a center, and the stator 12 is disposed opposite to the rotor 11 in the axial direction, and the stator 12 has a plurality of stator units 121 (including, for example, stator units 121-1, 121-2, 121-3, 121-4 . . . as shown in FIG. 1), and the plurality of stator units 121 are disposed around the central axis O-O', that is, disposed along the circumferential direction.

As shown in FIGS. 2, 4, and 5, each of the stator units 121 includes a core unit 1211 and a coil unit 1212, wherein the core unit 1211 is formed by a core piece, and the coil unit 1212 is formed by a wire wound and disposed around the core unit 1211. As shown in FIG. 5, a height D1 of the core unit 1211 in the axial direction is less than or equal to a height D2 of the coil unit 1212 in the axial direction. That is, the height D1 of the core unit 1211 in the axial direction is not greater than the height D2 of the coil unit 1212 in the axial direction.

With the above embodiment, the coil unit 1212 is disposed around the core unit 1211, and the height D1 of the core unit 1211 in the axial direction is not greater than the height D2 of the coil unit 1212 in the axial direction, so that all the core unit 1211 can be disposed inside the coil unit 1212 over the entire height range in the axial direction. In this way, the height of the coil unit 1212 in the axial direction is not limited by the height of the core unit 1211 in the axial direction; therefore, the dependency between the coil and the core in design and manufacture can be reduced, and the degree of design freedom can be improved.

In the embodiment, as shown in FIG. 4, the core unit 1211 and the coil unit 1212 may be disposed to have a gap 121s therebetween. As shown in FIG. 4, the gap 121s includes a gap all around the core unit 1211. By disposing the gap 121s between the core unit 1211 and the coil unit 1212, it is possible to avoid an electrical contact between the core unit 1211 and the coil unit 1212 and to facilitate the placement of the core unit 1211 into a hollow portion formed by the wound wire of the coil unit 1212. The size of the gap 121s may be set according to the actual needs as long as it is sufficient to avoid the electrical contact between the core unit 1211 and the coil unit 1212 and to facilitate the placement of the core unit 1211 into the hollow portion formed by the coil unit 1212.

In the embodiment, the size of the gap 121s at each position around the core unit 1211 may be set to be consistent or inconsistent. For example, as shown in FIG. 4, with the stator unit 121-3 taken as an example, the size of the gap 121s at each position around the core unit 1211 is set to be inconsistent; that is, the size at the left and right sides of FIG. 4 is narrower, and the size at the upper side of FIG. 4 is slightly wider, and the size at the lower side of FIG. 4 is the widest. The embodiment is not limited to the size setting manner in FIG. 4, and the size of the gap 121s at each position around the core unit 1211 may be set in other manners.

In the embodiment, the shape of the core unit 1211 may be set as desired according to the needs, as long as the core unit 1211 can be disposed in the hollow portion formed by the coil unit 1212. For example, the core unit 1211 may substantially be in a rectangular shape, a fan shape, a circular shape, a polygonal shape, or the like when viewed in the axial direction. The embodiment is not limited thereto, and the core unit 1211 may be disposed in other shapes.

In the embodiment, the core unit 1211 may be formed of any suitable material, such as a soft magnetic composite material. In addition, a thickness of the core unit 1211 can be set according to the actual needs and may be set, for example, to be greater than or equal to 2 mm.

In the embodiment, the core unit 1211 included in each of the stator units 121 may be disposed as one or plural in number according to the application requirements of the motor. In addition, the coil unit 1212 may also be disposed as one or plural in number. FIGS. 2, 3, and 4 show a case where both the core unit 1211 and the coil unit 1212 included in each of the stator units 121 are one in number.

Figure 6:
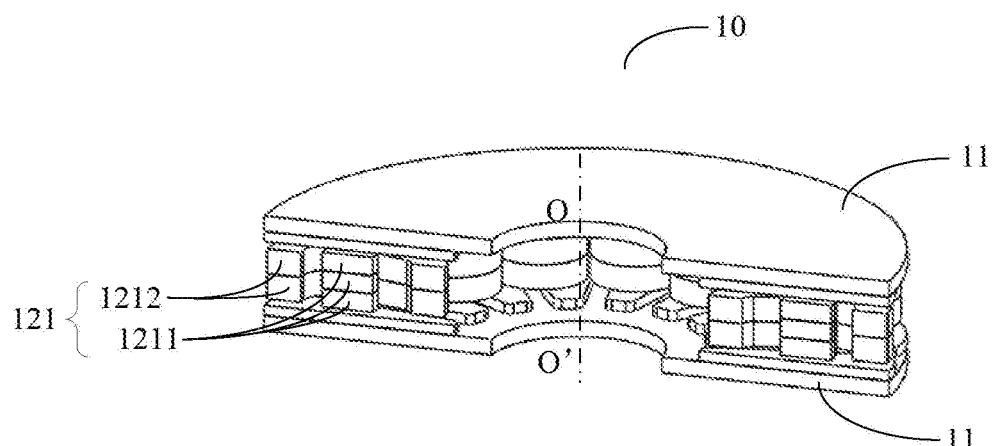
FIG. 6 is another schematic cross-sectional view of the axial flux motor of Embodiment 1 of the disclosure taken along a plane on which the central axis is located.

FIG. 6 is another schematic cross-sectional view of the axial flux motor of the embodiment taken along a plane on which the central axis O-O' is located. FIG. 6 shows a case where both the core unit 1211 and the coil unit 1212 included in each of the stator units 121 are plural in number. Specifically, the core unit 1211 included in each of the stator units 121 is three in number, and the coil unit 1212 is two in number. The embodiment is not limited thereto, and the core unit 1211 and the coil unit 1212 included in each of the stator units 121 may also be respectively disposed in other numbers.

Thus, by combining an appropriate number of the core units 1211 and the coil units 1212 in each of the stator units 121 of the motor, the motor can be adapted to different application requirements. In other words, the core units 1211 and the coil units 1212 included in each of the stator units 121 can be used in motors for different application requirements as long as the respective numbers of the core units 1211 and the coil units 1212 included in each of the stator units 121 can be adjusted correspondingly according to the application requirements. In this way, the core unit 1211 and the coil unit 1212 can be mass-produced, thereby saving development time and manufacturing cost.

In the embodiment, the stator unit 121 may further include an adjustment member that adjusts the position of the core unit 1211 in the axial direction. In this way, the central position of the core unit 1211 in the axial direction can be aligned with the central position of the coil unit 1212 in the axial direction, so that the stator unit 121 can obtain better magnetic characteristics.

Figure 7:
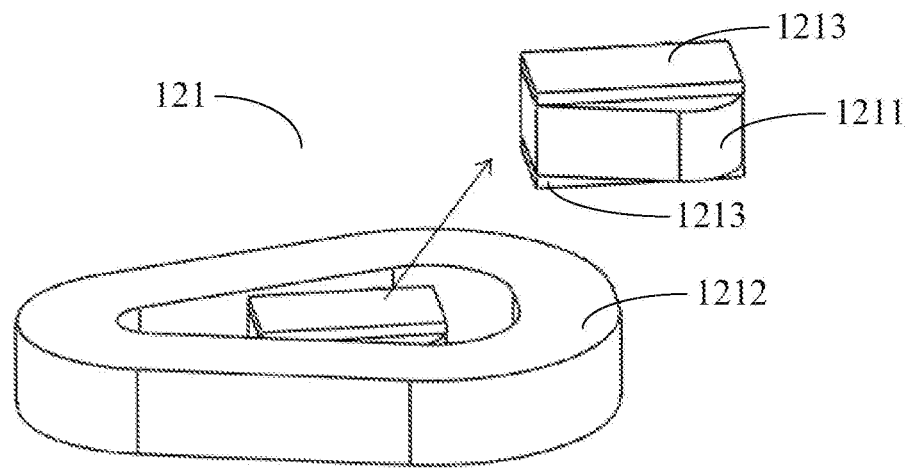
FIG. 7 is a schematic view of an adjustment member in the axial flux motor of Embodiment 1 of the disclosure.
Figure 8:
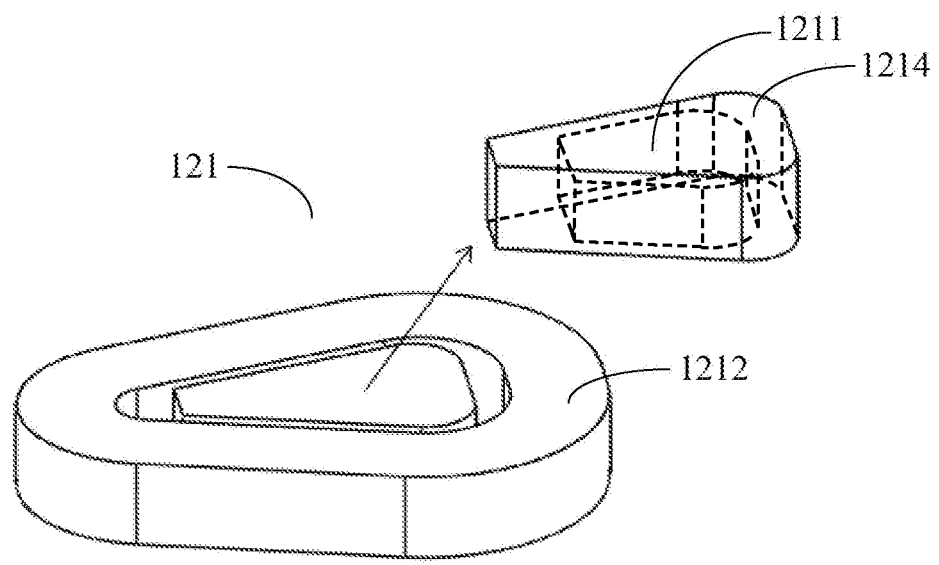
FIG. 8 is another schematic view of the adjustment member in the axial flux motor of Embodiment 1 of the disclosure.

FIG. 7 is a schematic view of the adjustment member. FIG. 8 is another schematic view of the adjustment member.

In an embodiment, as shown in FIG. 7, the adjustment member may be a spacer 1213 disposed on two sides of the core unit 1211 in the axial direction.

In another embodiment, as shown in FIG. 8, the adjustment member may be a cover member 1214 that covers the entire core unit 1211. In addition, the cover member 1214 is also shown in FIGS. 2 and 3.

Here, the spacer 1213 and the cover member 1214 may be formed of a material with heat dissipation property and without magnetic permeability, thereby facilitating the heat dissipation of the core unit 1211 without affecting the magnetic characteristics of the stator unit 121. The material may be, for example, a thermally conductive plastic or the like.

Figure 9:
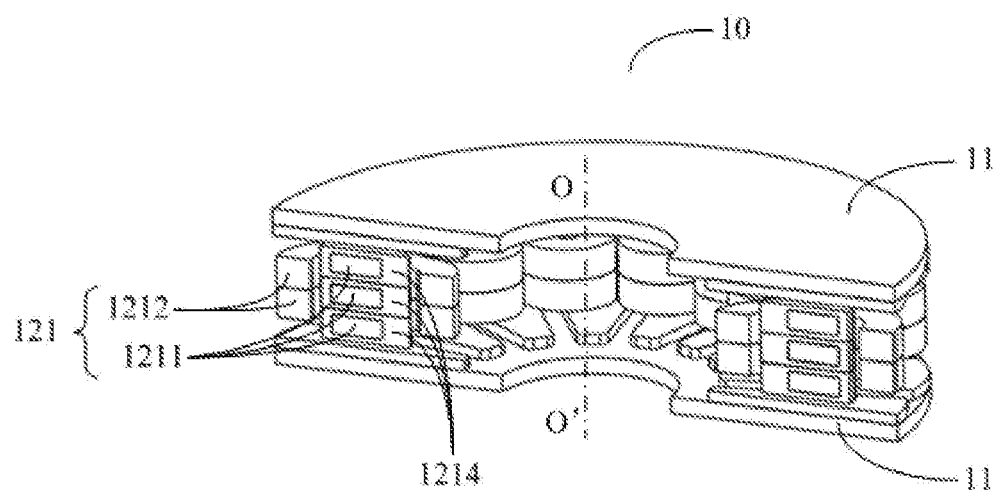
FIG. 9 is another schematic cross-sectional view of the axial flux motor of Embodiment 1 of the disclosure taken along a plane on which the central axis is located.

FIG. 9 is another schematic cross-sectional view of the axial flux motor in which the core units 1211 and the coil units 1212 are combined in the case where the cover members 1214 are disposed, taken along a plane on which the central axis is located. As shown in FIG. 9, each core unit 1211 is disposed with the cover member 1214, and each cover member 1214 and each core unit 1211 serve as a covered core unit, and a plurality of such covered core units are combined. In addition, similar to FIG. 6, a plurality of coil units 1212 are combined. Similarly, the cover member 1214 of FIG. 9 may be replaced with the spacer 1213.

However, the embodiment is not limited to the above implementation method. In this embodiment, other types of adjustment members may be disposed, or adjustment members may not be disposed.

Figure 10:
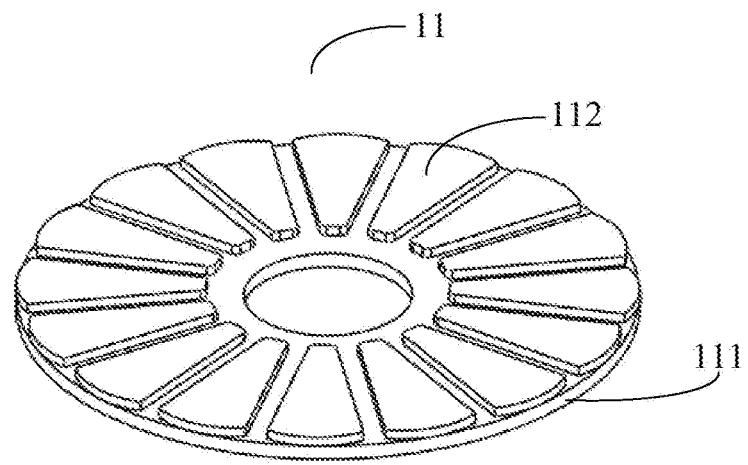
FIG. 10 is a schematic view of the rotor of the axial flux motor of Embodiment 1 of the disclosure.

FIG. 10 is a schematic view of the rotor of the embodiment. As shown in FIG. 10, the rotor 11 may include a disk-shaped yoke disk 111 and a magnet 112 disposed on the yoke disk 111 along the circumferential direction.

In the axial flux motor of the embodiment, as shown in FIGS. 1 to 3, the rotor 11 may be disposed as two in number, and the two rotors 11 are respectively disposed on two sides of the stator 12 in the axial direction, but the embodiment is not limited thereto.

Figure 11:
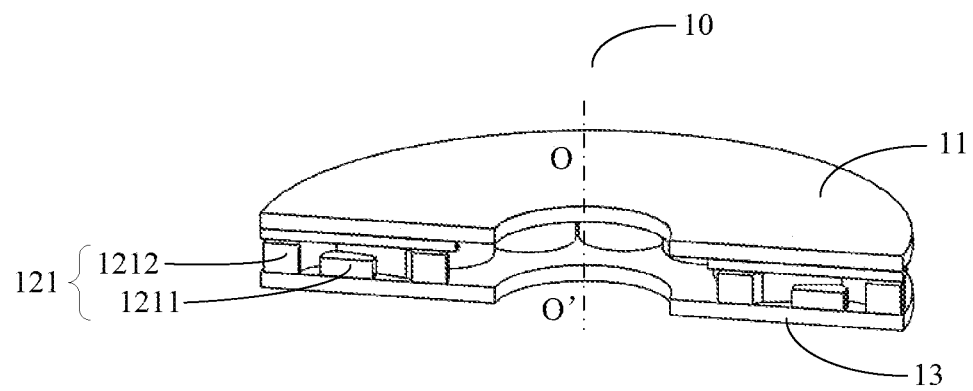
FIG. 11 is another schematic view of the axial flux motor of Embodiment 1 of the disclosure.

FIG. 11 is another schematic view of the axial flux motor of the embodiment. As shown in FIG. 11, the rotor 11 may be disposed as only one in number, and the one rotor 11 is disposed on either side of the stator 12 in the axial direction, and the other side of the stator 12 in the axial direction is fixed to a disk member 13 forming a magnetic conductive circuit. As shown in FIG. 11, in the stator unit 121, the core unit 1211 may be disposed such that its central position in the axial direction is closer to the disk member 13 than the central position of the coil unit 1212 in the axial direction, but the embodiment is not limited thereto. The core unit 1211 may be disposed such that the central position of the core unit 1211 in the axial direction and the central position of the coil unit 1212 in the axial direction are aligned by an adjustment member such as the spacer 1213 or the cover member 1214.

In the axial flux motor of the embodiment, by disposing the coil unit around the core unit and by disposing so that the height of the core unit in the axial direction is not greater than the height of the coil unit in the axial direction, the dependency between the coil unit and the core unit in design and manufacture can be reduced, and the degree of design freedom can be improved.

Embodiment 2

Embodiment 2 provides an electrical product having an axial flux motor, and the axial flux motor may be as described in the above Embodiment 1 and will not be described herein.

The electrical product of the embodiment may be any electrical product. For example, it may be a home appliance or an office equipment, such as an indoor unit of an air conditioner, an outdoor unit of an air conditioner, a water dispenser, a washing machine, a sweeper, a compressor, a blower, a mixer, or the like; it may be an industrial equipment, such as a pump, a conveyor, an elevator, a standard industrial general purpose machine, a wind turbine, a grinder, a traction motor, or the like; further, it may be various information processing equipment or the like.

With the electrical product of the embodiment, the dependency between the coil unit and the core unit in design and manufacture can be reduced, and the degree of design freedom can be improved.

The embodiments of the disclosure have been described in detail above with reference to the accompanying drawings, which illustrate the manner in which the principles of the disclosure can be employed. However, it should be understood that the implementation of the disclosure is not limited to the embodiments described above and further includes all changes, modifications, and equivalents made without departing from the spirit and scope of the disclosure.

What is claimed is:

1. An axial flux motor, comprising:
   a rotor which rotates with a central axis as a center;
   a stator which is disposed opposite to the rotor in an axial direction and has a plurality of stator units, the plurality of stator units being disposed around the central axis, and
   the stator unit further comprises spacers respectively disposed on two sides of the core unit in the axial direction, wherein the spacers are formed of material with heat dissipation property and without magnetic permeability, and a center position of the core unit in the axial direction is aligned with a center position of the coil unit in the axial direction,
   a cover member which covers the entire core unit, and the cover member is formed of a material with heat dissipation property and without magnetic permeability,
   wherein the stator unit comprises:

a core unit formed by a core piece; and
a coil unit formed by a wire wound and disposed around the core unit, wherein a height of the core unit in the axial direction is less than or equal to a height of the coil unit in the axial direction.

2. The axial flux motor according to claim 1, wherein the core unit and the coil unit are disposed to have a gap therebetween.

3. The axial flux motor according to claim 1, wherein the stator unit further comprises a plurality of core units and/or a plurality of coil units.

4. The axial flux motor according to claim 1, wherein
the rotor is two in number, and the two rotors are respectively disposed on two sides of the stator in the axial direction, or
the rotor is one in number, and the one rotor is disposed on one side of the stator in the axial direction.

5. The axial flux motor according to claim 1, wherein the core unit is formed of a soft magnetic composite material.

6. The axial flux motor according to claim 1, wherein a thickness of the core unit is greater than or equal to 2 mm.

7. The axial flux motor according to claim 1, wherein the core unit is in a rectangular shape or a fan shape when viewed in the axial direction.

8. An electrical product comprising the axial flux motor according to claim 1.

* * * * *